March 3, 1942. R. B. JOHNSON 2,275,396
RECORD CONTROLLED PERFORATING MACHINE
Filed March 19, 1941 5 Sheets-Sheet 1
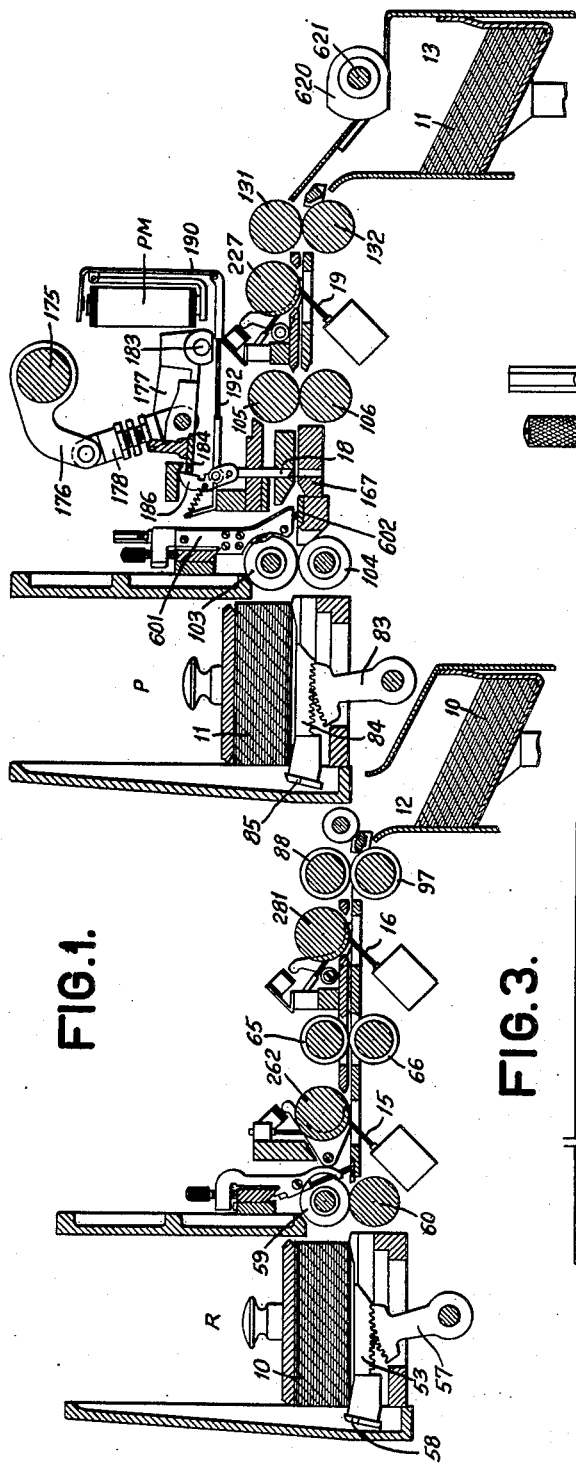
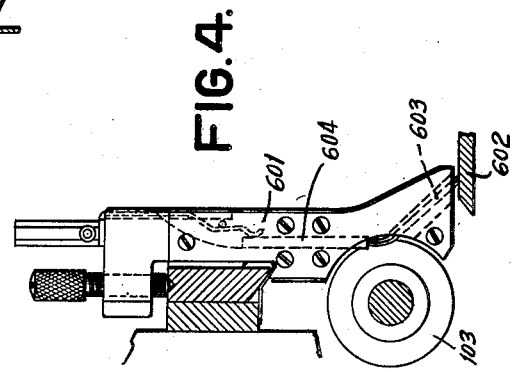
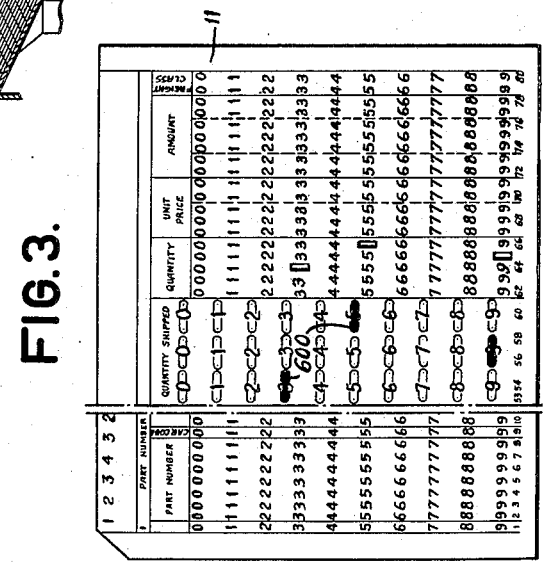
INVENTOR
Reynold B. Johnson
BY
ATTORNEY March 3, 1942. R. B. JOHNSON 2,275,396
RECORD CONTROLLED PERFORATING MACHINE
Filed March 19, 1941 5 Sheets-Sheet 2

INVENTOR
Reynold B. Johnson
BY
ATTORNEY

March 3, 1942.    R. B. JOHNSON    2,275,396
RECORD CONTROLLED PERFORATING MACHINE
Filed March 19, 1941    5 Sheets-Sheet 3

INVENTOR
Reynold B. Johnson
BY
ATTORNEY

March 3, 1942.    R. B. JOHNSON    2,275,396
RECORD CONTROLLED PERFORATING MACHINE
Filed March 19, 1941    5 Sheets-Sheet 4

INVENTOR
Reynold B. Johnson
BY
ATTORNEY

March 3, 1942.  R. B. JOHNSON  2,275,396
RECORD CONTROLLED PERFORATING MACHINE
Filed March 19, 1941  5 Sheets-Sheet 5
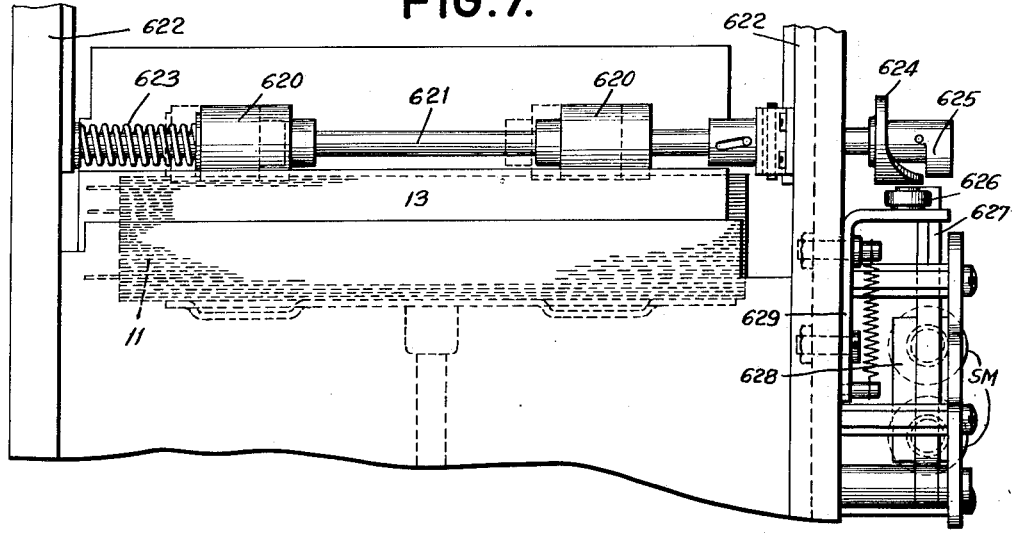
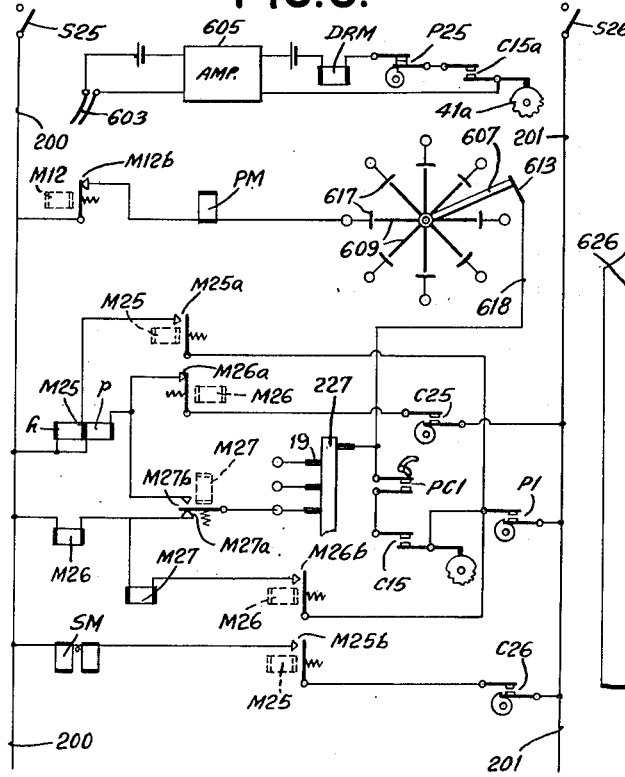
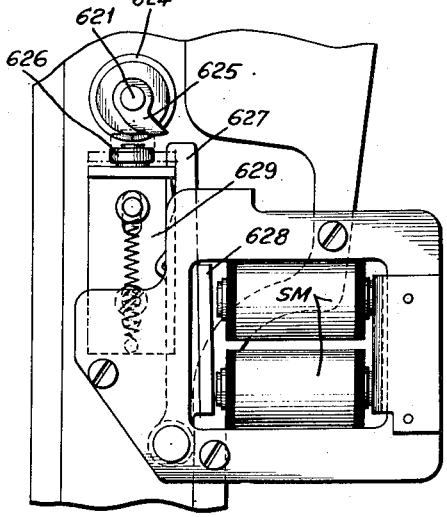
INVENTOR
Reynold B. Johnson
ATTORNEY Patented Mar. 3, 1942

2,275,396

UNITED STATES PATENT OFFICE 2,275,396

RECORD CONTROLLED PERFORATING MACHINE

Reynold B. Johnson, Binghamton, N. Y., assignor to International Business Machines Corporation, New York, N. Y., a corporation of New York Application March 19, 1941, Serial No. 384,155

17 Claims. (Cl. 164—115)

This invention relates to a machine for perforating record cards, and, more particularly to a perforating machine, wherein, differentially positioned conductive marks are sensed on successive record cards for effecting the punching of perforations thereon, in positions corresponding to the sensed conductive marks.

The present invention is an improvement of the perforating machine described in U. S. Patent No. 2,007,391, wherein conductive marks are sensed for controlling the punching of the perforations on the sensed record cards. In the said patent, the sensed data are stored in electromechanically operated relays, which relays, in turn, control the operations of the punch magnets, upon completion of the sensing operations.

In order to effect sensing of the conductive marks on the record cards, and perforating of the sensed cards, at a faster rate, the instant invention is proposed, and is arranged as an auxiliary device, which can be used in the well known type of high speed reproducing perforation machine, described in Reissue Patent No. 21,133.

The present invention comprises a rotary type of data storage means, which is operated, in synchronism, with the record card feeding mechanism. The sensed data, represented by the differentially disposed conductive marks, are stored for a predetermined number of cycle points of the machine. Upon the passage of the sensed record cards under the punches, the said synchronously operated storage means become effective to control the operations of the punches, thereby effecting perforating of the sensed record cards in positions corresponding to the sensed conductive marks. In addition thereto, means are provided, whereby the perforations are immediately sensed to control the operations of a record card segregating device.

It has been found, in mark sensing devices of the type suggested, due to the possibility of improperly formed conductive marks, or the presence of superfluous conductive marks thereon, and the like, that, provision must be made for checking the perforations punched in the sensed record cards, in order to determine, that false punching operations have not been effected, and, to determine, that the desired number of punching operations have been effected. Therefore, control circuits are provided, under control of the perforation sensing means, for controlling the operations of the card segregating device, whereby, all punched record cards which are at variance with the sensed cards are segregated from those which are in conformity with the sensed cards.

Accordingly, an object of the present invention resides in the provision of an improved perforating machine, whereby conductive marks on record cards are sensed for effecting perforating of the sensed records in accordance with the sensed data.

Another object of the present invention resides in the provision of an improved perforating machine wherein the perforated records are sensed immediately for determining whether the records are perforated so as to conform to the sensed records, and segregating the non-conforming records from the others.

Another object of the present invention resides in the provision of an improved data storage mechanism, which is operated in synchronism with the record feeding means, for controlling the perforating operations at a later time in the machine cycle.

Still another object of the present invention resides in the provision of an improved segregating device, in a machine of the type described, for segregating non-conforming records from the others.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a sectional elevation view of the machine showing the feeding, sensing and perforating devices.

Fig. 3 is a detail view showing a portion of a record card.

Fig. 4 is a detail view of one of the sets of sensing brushes.

Fig. 7 is a side elevation view of the card offsetting device.

Fig. 8 is a detail view of the control elements of the card offsetting device.

Fig. 9 is a circuit diagram of the machine.

Figure 2:
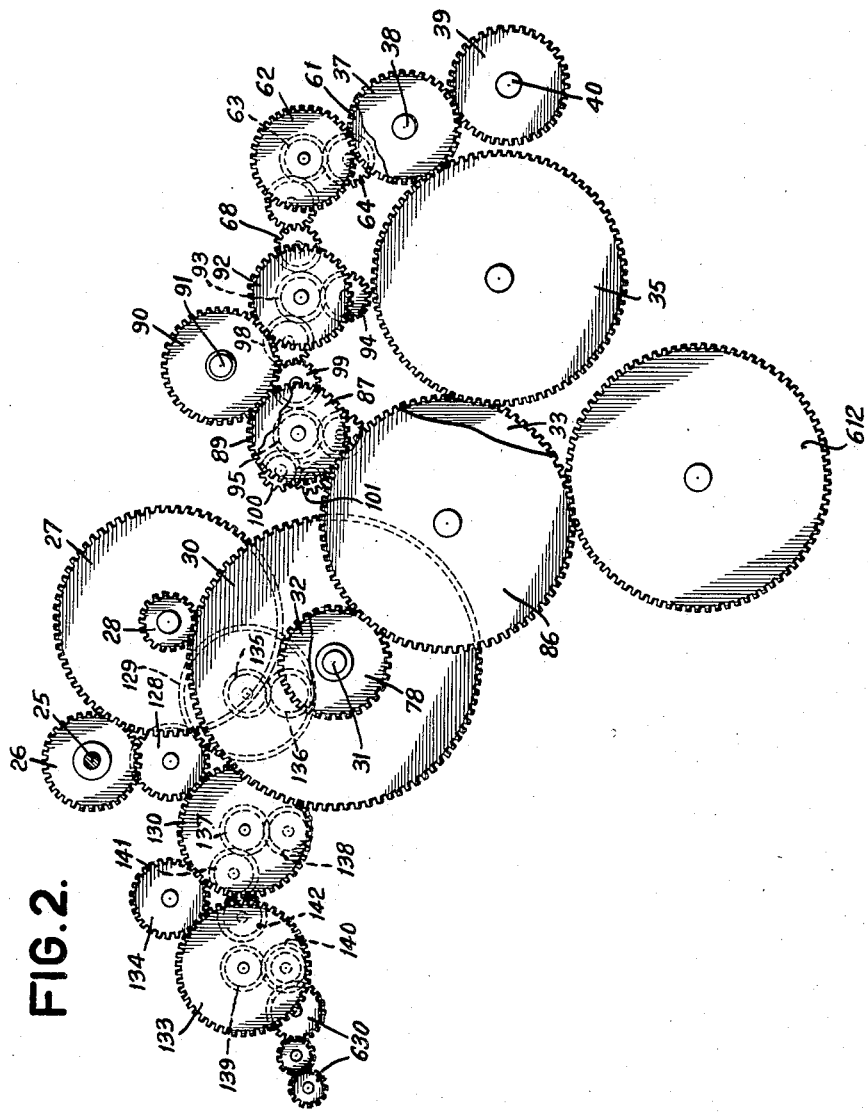
Fig. 2 is a simplified detail view showing, in part, the driving mechanism of the machine.

In Figs. 1 and 2, there are shown the essential elements of the card reproducing machine disclosed in the Reissue Patent No. 21,133 referred to hereinabove, and in briefly describing the operation of the said machine, the same reference characters are employed, as in the patent to facilitate ready reference thereto for further detailed explanation thereof. The reference numerals applied to the mechanism constituting the auxiliary device will accordingly begin with number 600.

The perforated pattern cards 10 are fed from the hopper R, by means of the oscillating arm 57 and reciprocating slide 53 carrying a picker 58, to a pair of feed rollers 59, 60, the latter conveying the individually fed cards to a sensing station, including brushes 15 and contact roller 202. From the said sensing station the cards are fed by rollers 65, 66 past a second sensing station comprising brushes 16 and contact roller 201, and then, by means of rollers 86, 87 to the discharge hopper 12.

Blank cards 11 are fed from the hopper P by the oscillating arm 83, reciprocating slide 84, and picker 85 to the feed rollers 103, 104, which rollers convey the said card to and past the punching station, comprising a row of punches 18 and die 167. Rollers 105, 106 then convey the punched card past the sensing station, comprising brushes 19 and contact roller 227, and, by means of rollers 131, 132, the said punched card is conveyed to discharge hopper 13. The sets of rollers which convey the blank card through the punching section of the machine are intermittently driven, so that the card is advanced in steps, with each row of index point positions pausing momentarily in the punching position to receive a perforation, if, at such time the magnet PM were energized.

Energization of the said magnet PM will rock its armature structure 190, drawing a link 192 toward the right, to effect coupling between an interposer 186 and a plate 184. The plate 184 is carried by member 177 pivoted at 183 and oscillated, by means of a link 178 connected to an arm 176 on shaft 175.

It is deemed sufficient, for the purposes of the present invention, to state, merely, that, as the pattern card 10 passes brushes 15, circuits are completed through the perforations in the pattern card to energize punch magnets PM, which magnets will effect coupling of the related punches to the oscillating plate 184, and effect punching in the corresponding index point positions of the blank card. After the pattern cards and blank cards have passed their respective sensing and punching stations, they pass, concurrently, the sets of checking brushes 16 and 19, respectively.

The main part of the driving mechanism of the machine is shown in Fig. 2, and comprises, briefly, a continuously rotating gear 26 fixed on shaft 25, which is driven by a motor and suitable driving connections (not shown). By means of gears 27 and 28, the said gear 26 effects rotation of the punch clutch driving gear 30 and gear 32 which is attached to the latter. Gear 30 is rotatably mounted on shaft 31. Clutch connections are provided (which for this description will be assumed to be tripped to effect the coupling connections) to effect rotation of shaft 31 to which gear 78 is secured. Through the gear train comprising gears 33, 35, 37, and 39, the shaft 40, carrying the C cams, is rotated continuously by the said gear 32.

A second clutch connection is provided (not shown and assumed to be tripped) to couple gear 57 to shaft 58 to which gear 61 is secured. The said shaft is provided with an eccentric (not shown) for operating the card feed picker slide 53. Feed rollers 59 and 60 are driven by the gears 61, 62 and 63, 64. Gear 68 which is driven by gear 63 drives the contact roller 202. The other feed rollers of the master card section of the machine are driven by gear 78. This last mentioned gear meshes with gear 86, which, in turn, drives gear 87 attached to feed roller 88. Another gear 89 on feed roller 88 meshes with a gear 90 attached to shaft 91 carrying the P cams. Gear 90 meshes with gear 92 to drive the gear connections 93, 94, 98, 99, 95, 100 and 101 to rotate rollers 87, 65, 66, and 201.

The card picker 84 of the punch section is reciprocated by means of cams (not shown) secured on shaft 31. The punch feeding rollers and contact roller are driven by gear connections rotated by gear 26 which comprise gears 128, 129, 130, 134, 133, and 135 to 142.

The description, up to this point, relates solely to the prior art machine described in greater detail in the aforementioned reissue patent which can be referred to for the description of the starting and operating control elements, and circuits for rendering the mechanism, which will be referred to hereinbelow, continuously operated.

In the description to follow, the record cards containing the conductive marks (which can be made, for example, by suitable graphite pencils) are placed in the hopper P, and are fed individually and successively therefrom by the card picker 84 to the feed rollers 103, 104.

A portion of a record card is shown in Fig. 3 having conductive marks 600 formed at the "3," "9," and "5" index point or marking positions. For practical reasons, the said conductive marks are formed across three normal columnar areas of the well known type of Hollerith card.

These cards are then fed by the said feed rollers past a mark sensing station, which is disposed ahead of the punching station, and comprises the sensing brush assembly 601 and insulating bar 602. In fact, the sensing brushes are provided in addition to the usual punch master card brush 17 (shown in the said reissue patent) and are placed in the same location as the said brush, with respect to the punching station. Each set of mark sensing brushes (see Figs. 4 and 9) comprises a plurality of spaced sets of stranded wires 603, which are disposed in an insulating member 604. The said sensing brushes are arranged with respect to the punching station, so that the index mark positions on the cards are sensed three cycle points before the corresponding index mark positions sensed are fed to the punching station.

An improved data storage device is controlled by the sensing brushes, upon sensing the conductive marks, for storing the sensed data for three points of the machine cycle, and then adapted to effect the energization of the related punch magnets PM to perforate the records in index point positions corresponding to the sensed marks.

In Fig. 3, the perforations, corresponding to the data represented by the conductive marks, are shown in the related "3," "9," and "5" index point positions. It will be noted, with reference to Fig. 3, that the marking positions for the conductive marks are located above the corresponding punching positions, for example, the "3" marking position is located between the "2" and "3" punching positions. In this manner, whenever, it is desired to punch in the marking area there will be no conflict between the perforations and the conductive marks (see U. S. Patent No. 2,007,391—Fig. 4 and lines 36-49 right, page 2).

Each set of sensing brushes 603 is connected to the input of a suitable electronic amplifier 605 (see Fig. 9), which is connected to be normally non-conductive, so that the related magnet DRM included in its output circuit remains deenergized, until a conductive mark engages and bridges the insulated brush strands, thereby causing the associated amplifier to become conductive to energize the magnet DRM in its output circuit. Further description of this type of sensing means is not deemed necessary, in view of the description of a similar type of sensing circuit described in U. S. Patent No. 2,209,106, see Fig. 16, upper left, and see lines 64-75 right page 4, and lines 1-5 left, page 5.

Figure 5:
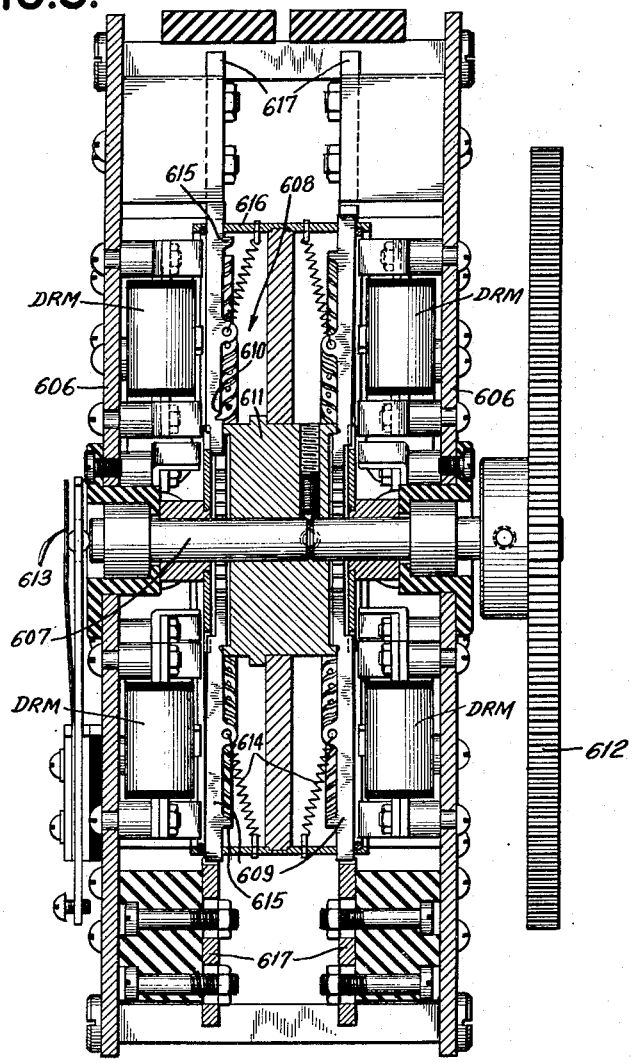
Fig. 5 is an elevation view, shown partly in section, showing the elements of the data storing device.
Figure 6:
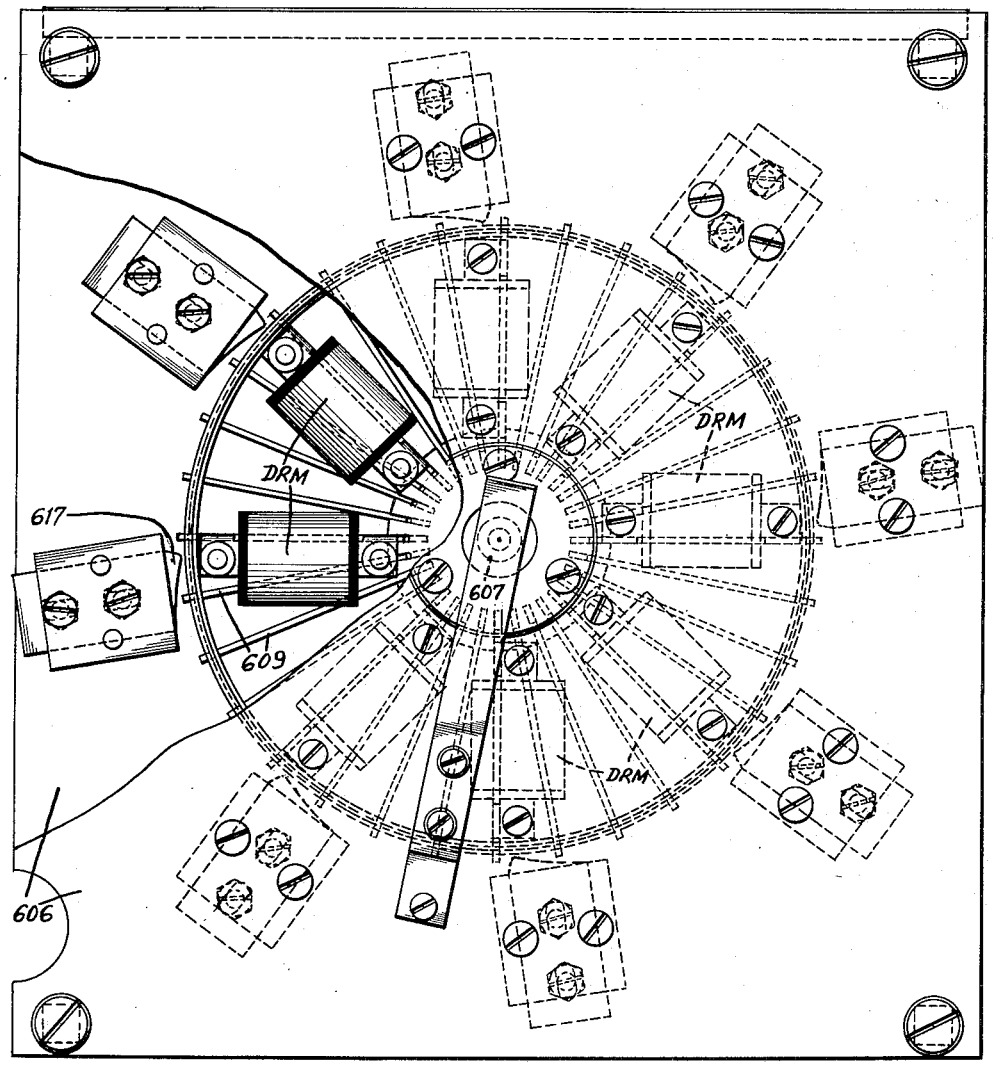
Fig. 6 is a side elevation view of the data storing device, having part of the side frame removed.

Referring now to Figs. 5 and 6, the data storage device is shown to comprise a plurality of circumferentially arranged and equally spaced magnets DRM which are secured to each fixed side member 606. Fixed to shaft 607 is an armature retainer ring 608, made of suitable conducting material, and secured to the said shaft in a conductive relationship thereto. The retainer ring comprises an inner circular section 611 and an outer circular section 616, each section suitably slotted to receive a group of equally spaced and radially arranged armatures 609. One end of each armature is provided with a notch 610, which normally engages the inner slotted circular section 611 to retain each armature in a latched position as shown.

The said shaft 607 is rotatably mounted in the side members 606, and suitably insulated therefrom, and has secured at one end thereof, a gear 612, made of suitable insulating material, which gear is rotated by gear 86 (Fig. 2). At the other end of said shaft a suitable contact spring 613 is arranged to constantly engage the shaft.

Now assume, during the rotation of the latched armatures, that, one of the magnets DRM is energized, thereby attracting the armature passing thereby, and unlatching the said armature from the inner section 611. By means of spring 614, the released armature is urged in an outwardly direction, so that the stop 615 thereof engages the inner circumference of the outer section 616 of the retainer ring. It should be mentioned that the armature ring is rotated by gears 86 and 612 in a timed relationship with the passage of the index point positions past the sensing station, i. e. an armature is arranged to be passing each magnet at the time an index point position passes the sensing brushes.

During the rotation of the released armature, the end thereof engages the fixed, arcuately shaped contact member 617, the latter being fixed at a distance from the related magnet, so that the released armature engages the contact member three cycle points later. Due to the arcuate shape of the said contact member, additional rotation of the released armature causes the latter to be pushed inwardly so as to become latched in the normal position. As shown in Fig. 6, a contact member is provided for each magnet, and fixed at the same distances from the related magnets.

With reference now to Fig. 9, and assuming that the marked cards are fed continuously by the mechanism described hereinabove, upon sensing a conductive mark the brushes 603 are bridged to render the amplifier 605 conductive to energize the magnet DRM in its output circuit. Cam controlled contacts C15a are closed each time an index point position on the card passes the sensing station, and functions the same as the contacts C15 (described in the said reissue patent). Cam controlled contacts P25 are closed during the entire part of the sensing cycle (which, as is well known, is less than a machine cycle). Upon energization of the said magnet DRM, one of the armatures 609, passing thereby, is released so that three cycle points later a circuit is established from conductor 200 to contacts M12b, punch magnet PM, contact member 617, released armature 609, shaft 607, contact spring 613, conductor 618, contacts PC1, C15, and cam contacts P1 to conductor 201, thereby energizing the said punch magnet. Upon energization of the punch magnet the related punch 18 is operated to perforate the sensed card in an index point position corresponding to that of the sensed conductive mark. The released armature is then relatched as described. It should be mentioned, that, at the times, the unreleased armatures engage the arcuately shaped contact members 617, cam controlled contacts C15 are opened, each cycle point of the machine during the sensing cycle, so as to prevent the completion of any circuits to the punch magnets PM by the engagement of the unreleased armatures and the said contact members.

It is understood that a plurality of columns on the cards are sensed simultaneously, and that the described circuits are duplicated for each desired column. The capacity of the described storage device is 16 columns, which obviously can be increased, if desired. The control circuits shown in Fig. 9, relating to the auxiliary device described herein, can be disconnected from the control circuits shown and described in the said reissue patent by the switches S25 and S26.

As stated hereinabove, the perforated cards are fed by rollers 105, 106 past the punch sensing station or checking station, comprising sensing brushes 19, to determine the conformity of the punched cards with the sensed marks formed thereon, by detecting the presence of double punchings in the individual columns on the cards, or the absence of punchings therein, when such perforations should be present. Those punched cards which are at variance with the sensed cards, in this respect, are segregated from the other cards, by means of a novel offsetting device.

The control circuits will be explained first, with reference to Fig. 9, wherein the circuit connections for checking one column only are shown. It is obvious and understood that similar circuit connections are employed for checking other desired columns. The perforations in the cards are sensed by brushes 19 to complete a circuit as follows: line 200, magnet M26, contacts M27a, brush 19, conducting roller 227, contacts PC1 and C15, cam contacts P1 to line 201, energizing said magnet. A holding circuit is established therefor, by means of contacts M26b, which contacts connect both magnets M26 and M27 across the said lines. Energization of the latter (which occurs after contacts C15 open) causes contacts M27a to open and M27b to close, thus completing a circuit from brush 19 to the pickup coil p of relay M25. In the event, a second perforation is not sensed in the column on the card in question, further control operations are not effected.

However, assume that, one of the sensed cards is marked incorrectly, and contains two marks in one of the columns where only one should be. Two perforations are caused to be punched in this column on the card by the circuits just described. Upon detection of the first perforation the circuits just traced are established. Now, upon sensing the second perforation, a circuit is completed from brush 19 to contacts M27b and the pickup coil p of relay M25, to line 200, energizing said relay to effect closure of contacts M25a and M25b. A holding circuit is completed by contacts M25a from line 201 to contacts P1 and M25a to the holding coil h of relay M25 and line 200. This holding circuit is maintained during the entire sensing cycle. Shortly after the sensing operations, the cam contacts C26 are closed momentarily to effect energization of the control magnet SM of the segregating device, thereby causing this card to be segregated from the others. The control circuits are returned to normal near the end of the machine cycle when contacts P1 are opened.

In the event, the card is devoid of a perforation, where one should be, this blank condition is detected in the following manner. Cam contact C25 are closed momentarily, immediately after the sensing operations, and slightly before the closure of cam contacts C26, to send an impulse to the pickup coil p of the relay M25 through the normally closed contacts M26a. For this assumed condition magnet M26 is not energized. The described holding circuit is then established for relay M25, so that the contacts M25b are held closed until contacts C26 are closed to effect energization of the said control magnet SM. In this manner, the blank conditions on the cards are detected.

Referring now to Figs. 7 and 8, the segregating or offsetting device will be explained. The mutilated stacker rolls 620 are mounted on the rotating shaft 621 which is arranged to move axially in the side members 622. A spring 623 maintains the shaft and stacker rolls in the normal position shown in Fig. 7. At one end of the said shaft two cam members are provided namely 624 and 625, respectively. The cam member 624 is an offsetting cam, and the member 625 is a restoring cam.

A cam roller 626 is provided, the positioning of which is controlled by a latch member 627 secured to the armature 628 of magnet SM. Normally, the cam roller 626, which is mounted on a slidable bracket 629, is held out of the path of the said cam members, by virtue of the latched member 627. Under these conditions the cards 11 are all stacked in a normal position, as shown in Fig. 7, in the discharge hopper 13 by the stacker rolls 620. Upon energization of the magnet SM, as described, the armature 628 and latch member 627 are moved to the right as viewed in Fig. 8, to release the spring urged bracket 629 carrying the cam roller 626. Upon release thereof, the cam roller is raised upwardly in the path of cam member 624. The engagement of the sloping portion of the latter with the cam roller causes the shaft 621 to be moved axially to the left, as viewed in Fig. 7, thus, causing the card engaged by the stacker rolls 620, at this time to be offset with respect to the other cards in the stack, as shown in the last mentioned figure. After engagement of the high point of the cam member 624 with the cam roller, the restoring cam member 625 engages the cam roller to lower it and the supporting bracket 629 to its normal position, where the latter is latched by the latch member 627. The said shaft 621 is rotated by the gearing indicated by the reference numeral 630 and gear 140. In this manner, cards having double punchings or blank areas, where perforations should be present, are segregated from the other punched cards, in the discharge hopper 13.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A cyclically operable perforating machine comprising, means for sensing successively the index point positions of an imperforate record bearing data designations, during each cycle of the machine, perforating means, means, operating in synchronism with the sensing means, and controlled thereby, for storing, during each cycle, the data represented by the sensed designations, and means controlled by the said storing means for controlling the perforating means, during each said cycle, for perforating the sensed record at the index point positions corresponding to those of the sensed data designations.

2. The invention set forth in claim 1, wherein, the said storing means comprises rotary means and electromagnetically operated control means therefor, the latter being under control of the said sensing means.

3. The invention set forth in claim 1, wherein, the said storing means comprises a plurality of fixed magnets, one for each column of data designations, rotatable armatures, and means for presenting the latter to the magnets in timed relationship with the sensing of the index point positions.

4. A cyclically operable perforating machine comprising, stationary sensing means, means for feeding an imperforate record bearing data designations, during each cycle of the machine, past the sensing means, whereby the latter sense successively the index point positions of each record, perforating means, means, operating in timed relationship with the record feeding means, and controlled by the sensing means, for storing, during each cycle, the data represented by the sensed designations, and means controlled by the said storing means for controlling and perforating means, during each said cycle, for perforating the sensed record at the index point positions corresponding to those of the sensed data designations.

5. A perforating machine of the class described, comprising, cyclically operable means for sensing successively the index point positions of an imperforate record bearing data designations, perforating means, means, operated in synchronism with the sensing means, and controlled thereby, for storing the data represented by the sensed designations, and means controlled by the said storing means for controlling the perforating means whereby the sensed record is perforated at the index point positions corresponding to those of the sensed data designations.

6. The invention set forth in claim 1, wherein, sensing means are provided for sensing immediately the perforated record, and means controlled by the last mentioned sensing means for segregating those records, discharged from the perforating means, which are at variance with the sensed records before reaching the perforating means.

7. The invention set forth in claim 1, wherein, sensing means are provided for sensing immediately the perforated record, and means, controlled by the last mentioned means, for segregating those records discharged from the perforating means, which are at variance with the sensed records before reaching the perforating means, including means for detecting the presence of unwanted perforations thereon, or detecting the absence of any perforation where one should be present.

8. The invention set forth in claim 1, wherein, sensing means are provided for sensing immediately the perforated record, and means controlled thereby for offsetting those records, discharged from the perforating means, which are at variance with the sensed records before reaching the perforating means.

9. A perforating machine of the class described, comprising, means for sensing successively the index point positions of an imperforate record bearing data designations, perforating means, means controlled by the sensing means for rendering the perforating means effective to perforate the sensed record at index point positions corresponding to those of the sensed data designations, means for sensing immediately the perforated record, and means controlled by the last mentioned sensing means for segregating those records, discharged from the perforating means, which are at variance with the sensed records before reaching the perforating means.

10. A data storing device adapted for use in a record controlled machine comprising, a plurality of fixed electromagnets, a rotatable armature retainer including a plurality of radially arranged and equally spaced armatures, means for normally retaining the said armatures in latched positions and capable of releasing certain of said armatures as the latter are positioned past those electromagnets which are energized, and fixed contact means engaged by said released armatures, upon further rotation thereof.

11. A data storing device adapted for use in a record controlled machine comprising, a fixed electromagnet, a plurality of rotatable, latched armatures having means for unlatching certain ones of said armatures as the latter are positioned past the electromagnet, at such times, when the latter is energized, and contact means engaged, during the rotation of said armatures, by the said released armatures.

12. The invention set forth in claim 10, wherein, means are provided for effecting resetting of the said released armatures to the normal latched positions, after the engagement of the latter with the said contact means.

13. A data storing device adapted for use in a record controlled machine comprising, a plurality of fixed electromagnets, a rotatable armature retainer comprising outer and inner circular sections of electrical conducting material, said sections being slotted to receive a plurality of radially arranged and equally spaced armatures, means included in each of said armatures to cooperate with the said inner circular section to retain the armatures in normally latched positions, said last mentioned means permitting the release of those armatures passing those electromagnets which are energized, at such times, and contact means engaged by the said released armatures.

14. The invention set forth in claim 13, wherein the contact means comprise a plurality of fixed arcuately shaped contact members which are effective to cause resetting of the said released armatures, to the normal latched positions, while the latter are in engagement with the contact means and after the engagement of the two for a predetermined time.

15. A segregating device adapted for use, in a record controlled machine comprising, a rotatable and axially displaceable shaft, stacker rolls disposed on said shaft, positioning means mounted on one end of said shaft, and control means called into action to cooperate with said positioning means for effecting axial displacement of the said shaft and rolls.

16. The invention set forth in claim 15 wherein said control means comprise a positionable element and electromagnetically controlled means for controlling the positioning of said element whereby the latter is capable of cooperating with the said positioning means.

17. The invention set forth in claim 15 wherein the said positioning means comprises cam member means.

REYNOLD B. JOHNSON.